United States Patent [19]

Frigger et al.

[11] 4,424,886
[45] Jan. 10, 1984

[54] FLOATING CALIPER SPOT-TYPE DISC BRAKE, PARTICULARLY FOR AUTOMOTIVE VEHICLES

[75] Inventors: Heinz Frigger, Langen-Oberlinden; Rainer Hoffmann, Kelkheim-Fischbach, both of Fed. Rep. of Germany

[73] Assignee: ITT Industries, Inc., New York, N.Y.

[21] Appl. No.: 290,118

[22] Filed: Aug. 5, 1981

[30] Foreign Application Priority Data

Aug. 29, 1980 [DE] Fed. Rep. of Germany ....... 3032511
Aug. 29, 1980 [DE] Fed. Rep. of Germany ....... 3032512

[51] Int. Cl.³ ..................... F16D 55/224; F16D 65/02
[52] U.S. Cl. ............................. 188/73.35; 188/73.39; 188/73.45
[58] Field of Search ............... 188/73.35, 73.36, 73.37, 188/73.38, 73.39, 73.41, 73.45, 73,44, 73.43, 370, 369, 205 A, 73.42, 73.31–73.47

[56] References Cited

U.S. PATENT DOCUMENTS

| | | | |
|---|---|---|---|
| 4,084,665 | 4/1978 | Burnett | 188/73.45 |
| 4,219,106 | 8/1980 | Lüpertz et al. | 188/73.39 X |
| 4,308,938 | 10/1982 | Denton | 188/73.45 |
| 4,334,598 | 6/1982 | Portolese | 188/73.44 |

Primary Examiner—Douglas C. Butler
Attorney, Agent, or Firm—James B. Raden; Marvin M. Chaban

[57] ABSTRACT

A floating caliper spot-type disc brake includes a stationary carrier member and a caliper member which is guided for sliding along a predetermined plane in and opposite to a given direction relative to the carrier member. The caliper member has a pair of bores and the carrier member has a pair of bolts affixed thereto which, in the assembled position, are received in the respective bores. An elastic tubular intermediate member is received in each of the bores and guidingly receives the respective bolt. The intermediate member has an elastic portion which, prior to the assembly of the members, extends into the space occupied by the respective bolt after the assembly, so that this elastic portion is deformed during the assembling operation and thus exerts a biasing force on the respective bolt in the assembled condition to eliminate clearances at the end of the caliper remote from the mounting region thereof. The elastic portion may be the result of providing an inclination either between the axes of the surface bonding the bore and the above space, or between the internal and external surfaces of the tubular intermediate element.

7 Claims, 5 Drawing Figures

FLOATING CALIPER SPOT-TYPE DISC BRAKE, PARTICULARLY FOR AUTOMOTIVE VEHICLES

BACKGROUND OF THE INVENTION

The present invention relates to a floating caliper spot-type disc brakes in general, and more particularly to disc brakes of this type which are suited for use in automotive vehicles.

There are already known various constructions of disc brakes of this type which are being used for applying braking forces to a disc which is rotatably mounted on a support, such as on the body of a motor vehicle. One construction of a disc brake of this type is disclosed in the commonly owned U.S. Pat. No. 4,219,106 which shows that the disc brake includes a carrier member which is stationarily mounted on the vehicle, and a caliper member which is floatingly guided on the carrier member for translatory movement in and opposite to a predetermined direction in response to the energization and de-energization of the brake. The floating guidance of the caliper member on the carrier member is at least partially accomplished, in this particular construction, by two guide pins rigidly connected to the carrier member which coaxially pass through associated openings in the caliper member. In another floating caliper spot-type disc brake of the type here under consideration which is disclosed in the commonly owned U.S. Pat. No. 4,276,965, the guide pins are supported and guided in the openings of the carrier member by respective sleeves of elastic material which are interposed between the external surfaces of the respective pins and the surfaces bounding the openings in the carrier member.

Among other advantages, the mounting of the guide pins in the associated openings via the elastic sleeves avoids the generation of rattling noises at this mounting region. However, it was found that, especially when the vehicle travels over rough roads, the oscillatory movements of the caliper member and/or other components of the brake which are or may come into contact with the carrier or caliper members may still result in the generation of rattling noises, especially at the brake region which is remote from the mounting region. Thus, it is customary in the brake manufacturing field to employ a resilient element or a plurality of resilient elements for eliminating any clearances which may exist between the various brake components and the presence of which could result in the generation of rattling noises.

In this construction, the caliper member rests on portions of the backing plate of a brake shoe which is disposed at the aforementioned remote region. The backing plate, in turn, is being guided on arms of the carrier member which extend over the periphery of the brake disc. The caliper member is guided on the two bolts or pins for sliding axially thereof. The pins are secured to the carrier member and are disposed at the part of the caliper member which carries the actuating cylinder, extending in the direction of the axis of the cylinder. To achieve the elimination of any clearances and thus of the rattling noises, there is provided a leafspring which is fastened at its central section to the end face of the caliper member which is remote from the actuating device and which includes two spring arms that extend substantially parallel to the brake disc and are in sliding contact with the arms of the carrier member. Despite the fact that the construction and mounting of this spring are much simpler than those encountered in connection with previously proposed biasing or urging springs provided for a similar purpose, the fact remains that the very need for providing and mounting an additional biasing element complicates the construction of the disc brake and makes the assembly thereof more time-consuming than necessary. Moreover, the manufacturing costs of the spring have to be added to those of the remainder of the disc brake, together with the labor costs attendant to the mounting of the spring, which further contributes to the already relatively high cost of the disc brake.

SUMMARY OF THE INVENTION

Accordingly, it is a general object of the invention to avoid the disadvantages of the prior art.

More particularly, it is an object of the invention to so construct the floating caliper spot-type disc brake of the type here under consideration as not to be possessed of the disadvantages of the conventional brakes of this type.

Yet another object of the present invention is to so design the brake of the type here under consideration as to be able to dispense with the previously necessary additional biasing spring or springs.

It is still another object of the invention to provide a floating caliper spot-type disc brake which is simple in construction, easy to manufacture and assemble, and reliable in operation nevertheless.

In pursuance of these objects and others which will become apparent hereafter, one feature of the present invention resides in a floating caliper spot-type disc brake, particularly for use in automotive vehicles for applying braking forces to a disc rotatably mounted on a support, this disc brake comprising, in combination, a carrier member stationarily mounted on the support; a caliper member; means for guiding the caliper member on the carrier member for movement in and opposite to a predetermined direction at least through a plurality of assembled positions, this guiding means including, at least, means for defining at least one opening in one of the members, at least one annular intermediate element accommodated in the opening and bounding a passage, and at least one elongated guide element secured to the other of the members and received in the passage in the assembled position such that the axis of the passage and of the elongated guide element coincide with the predetermined direction; and means for urging the members toward the assembled positions, including at least one elastically yieldable region of the mounted intermediate element extending, in its relaxed position assumed after accommodation of the intermediate element in the opening and prior to the assembly of the members, into the space occupied by the elongated element in the assembled positions for this elastically yieldable region to be elastically deformed and to apply its restoring forces to the elongated guide element in the assembled positions of the carrier and caliper members. It is particularly advantageous when the elastic region of the intermediate element is delimited by an internal surface which bounds the aforementioned passage and is centered on an axis spatially inclined relative to that of the aforementioned space in the relaxed position of the elastically yieldable region.

When the floating caliper spot-type disc brake is constructed in the above-mentioned manner, there is obtained the advantage that the annular or tubular intermediate element which is to be provided in any event and which is usually made of an elastic material in its entirety, not only has a damping effect on the caliper member and on the elongated element when the disc brake is subjected to vibrations, jolts, or oscillations, but also simultaneously, due to the deformation of the elastically yieldable portion thereof, applies a moment to the brake caliper member and presses the latter against guiding surfaces provided on the brake carrier member at that part thereof which is remote from the region of mounting of the caliper member of the elongated element. Generally speaking, the magnitude of this moment depends only on the angle of inclination of the axis of internal surface relative to that of the aforementioned space prior to assembly of the cylinder and caliper members, on the physical properties and especially the resiliency of the material of the intermediate element, and the amount of deformable material of the elastic intermediate element which is available for deformation. In this manner, there is obtained a floating caliper spot-type disc brake which has a very simple design and which can be manufactured at considerably reduced cost, and yet the noise generated by this brake when the vehicle carrying the same travels on uneven roads it is very low and, as a matter of fact, encountered only under such extreme circumstances where the conventional brake constructions using separate springs would generate noise as well.

According to an advantageous aspect of the present invention, the guide means guides the caliper member for the translatory movement through the assembled positions along a predetermined path extending in the aforementioned direction and the inclined axis is situated in a plane normal to the predetermined plane and intersecting the same at the axis of the aforementioned space. In this respect, it is further advantageous when the defining means, the guide and intermediate elements, and the urging means together constitute a guiding unit and when the guiding means further includes an additional guiding unit similar to the above-defined guiding unit and spaced therefrom transversely to the aforementioned direction in the predetermined plane. In this manner, there is obtained an advantageous situation where the forces acting between the guiding surfaces of the caliper member and those associated with the carrier member act substantially normal to such guiding surfaces.

According to one concept of the present invention, the means for defining the opening includes a confining surface in the one member which is centered on the inclined axis, and the intermediate element has an external surface which is parallel to the internal surface and conforms to the confining surface at least after the accommodation of the intermediate element in the opening. Under these circumstances, the tubular wall of the intermediate element has uniform thickness throughout, so that such element can be obtained by severing a hose-like formation into sections of the desired lengths.

However, it is also advantageous, in accordance with a further facet of the present invention, to have the confining surface which bounds the opening center on the axis of the aforementioned space, in which case the external surface of the intermediate element is centered on an axis which is inclined to that of the internal surface to the same extent as the inclined axis is inclined relative to the axis of the space after the accommodation of the intermediate element in the opening.

This particular construction has the advantage, especially when two of the guiding units are provided as mentioned before, that the openings in the one member and that the axis of the elongated elements are disposed in parallel to each other following assembly so that the manufacture of the disc brake is simplified with respect to that discussed above. More particularly, only the elastic intermediate element has a slightly changed configuration with respect to the standard configuration thereof. It is considerably less expensive when utilizing the basic concept of the present invention to alter the shape of the elastic intermediate element which is made of rubber or similar plastic material than to make the appropriate changes in the one member which has the opening or openings and which is made of steel or cast iron. When the elastic intermediate element is to be altered, it is merely necessary to modify the shape of the cavity in the injection mold, and then the modified intermediate element can be easily mass produced. In contrast thereto, manufacture and assembly of openings and elongated elements which are not parallel to one another involves considerable difficulties.

The clamping of the brake caliper member relative to the brake carrier member as accomplished by the employment of the inherent elasticity of the material of the intermediate members dispenses with otherwise existing need for using a leaf-spring or a similar biasing element as employed in the heretofore known floating caliper spot-type disc brakes. In addition thereto, it is no longer necessary to provide any bores or other recesses in either one of the members for fastening the spring element to the respective member. Thus, the floating caliper spot-type disc brake of the present invention has a much simpler construction and can be manufactured considerably lower cost than the conventional brakes of this type. It is further advantageous when the inclined axis encloses an angle of between 3° and 8° with that of the aforementioned space and with the predetermined direction and/or plane. Experience has shown that, when the angle of inclination lies within this range, there is obtained a sufficient clamping of the brake caliper member with respect to the brake carrier member. Moreover, the elastic urging effect of the intermediate element on the brake carrier member is maintained for a sufficiently long time, and the elastic intermediate element will not prematurely fatigue when the angle of inclination is within the above-mentioned range.

BRIEF DESCRIPTION OF THE DRAWINGS

Above-mentioned and other features and objects of this invention will become more apparent by reference to the following description taken in conjunction with the accompanying drawings, in which.

DETAILED DESCRIPTION OF THE PREFERRED EMBODIMENT

Figure 1:
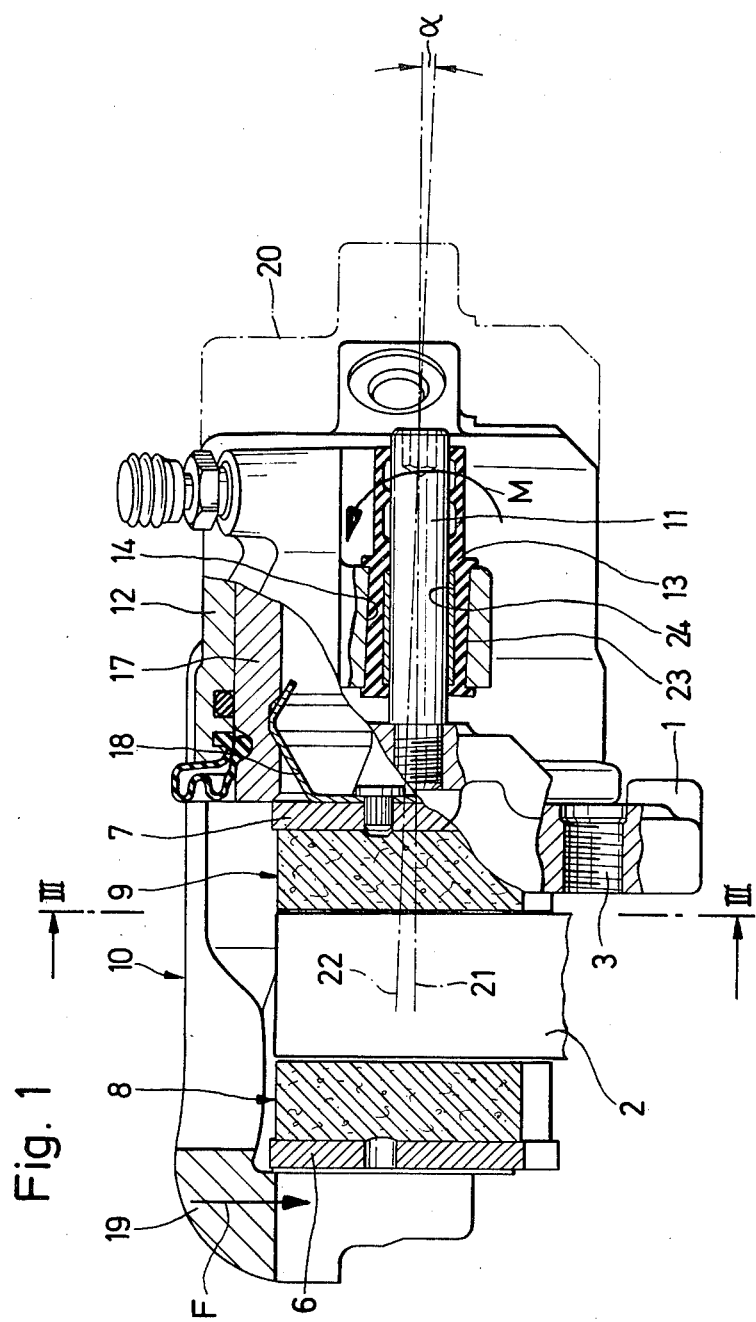
FIG. 1 is a partially sectioned side elevational view of a floating caliper spot-type disc brake embodying one construction of an urging guide unit according to the present invention.
Figure 2:
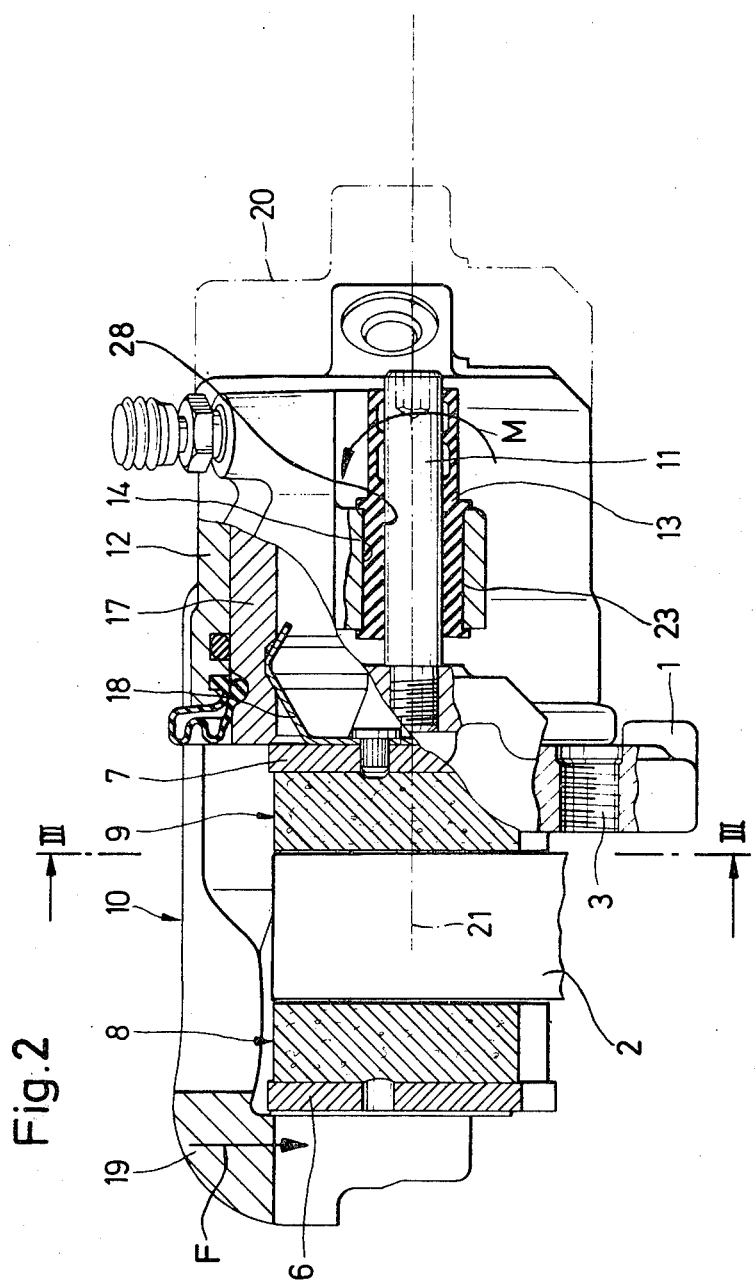
FIG. 2 is a view similar to FIG. 1 but showing a modified construction of the guide unit.

Referring now to the drawing in detail, and first to FIGS. 1 and 2 thereof, it may be seen that a floating-caliper spot-type disc brake comprises a brake carrier member 1 extending substantially in parallel to a brake disc 2, in its mounted position. The brake disc 2 extends into a space between a pair of brake shoes 8, 9. The carrier member 1 is adapted to be mounted on a non-illustrated wheel carrier, a steering knuckle, or a similar support portion of a vehicle by means of screws that can be threaded into threaded bores 3. The brake carrier member includes arms 4, 5 extending over the periphery of the brake disc 2. Each of the arms 4, 5 has a guide groove engaged by the ends of carrier plates 6, 7 of the brake shoes 8, 9.

The brake shoes 8,9 are actuated by a brake caliper member 10 which is disposed between the arms 4,5 of the brake carrier member 1 and extends across the two brake shoes 8, 9 and the periphery of the brake disc 2 at a radial outward spacing therefrom. The brake caliper member 10 is axially slidably guided on two bolts or guide elements 11 secured to the brake carrier member 1. Each of the bolts 11 is disposed at a different side of a brake actuating cylinder 12 forming one leg of the brake caliper member 10, the bolts 11 extending in parallelism with an axis 16 of the cylinder 11. The bolts 11 are received in tubular elastic intermediate elements 13 which are substantially cylindrical. The elastic intermediate elements 13 are disposed in cylindrical bores 14 provided in the brake caliper member 10.

Figure 3:
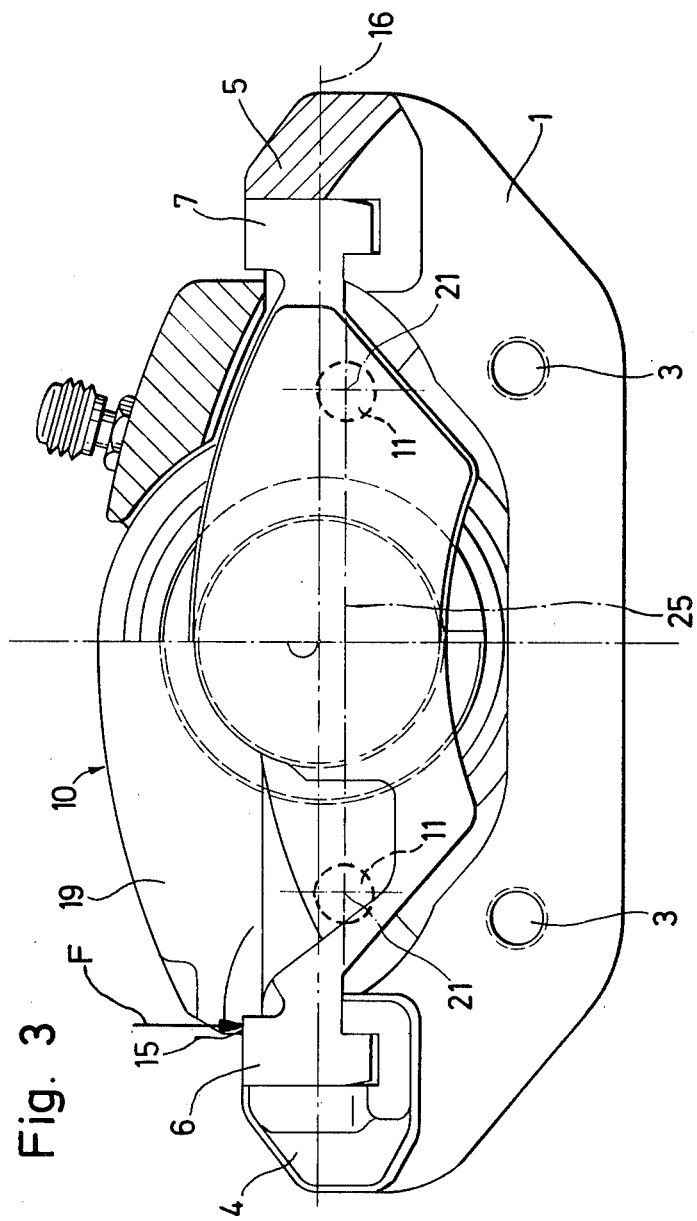
FIG. 3 is an elevational view of the disc brake according to FIG. 1 or 2 as partially cross-sectioned on line III—III.

In a construction shown in FIGS. 1 and 3 so long as the brake caliper member 10 is not assembled with the brake carrier member 1, respective axis 22 of the openings or bores 14 and of outer peripheral surfaces 23 and of the inner enclosing surfaces 24 of the elastic intermediate elements 13 approximately coincide with one another and are inclined at an angle α in the assembled state. After the brake caliper member 10 has been assembled with the brake carrier member 1, the bolts 11 and the guiding surfaces 15, because of their locations, will urge the brake caliper member 10 into such a position that the axes 22 of the bores 14 and those of the outer peripheral surfaces 23 of the associated elastic intermediate elements 13 are inclined at the angle α relative to the axes 21 of the bolts 11 and those of the inner enclosing surfaces 24 of the associated elastic intermediate elements 13. The fact that the axes of the inner enclosing surfaces 24 of the elastic intermediate elements 13 now have to become centered on the axes 21 of the respective bolts 11 results in deformation of the elastic infernmediate elements 13 in such a way that a moment M will be exerted by the latter on the brake caliper member 10 acting in a counterclockwise direction, so that the brake caliper member 10 is indirectly urged with a force F against the guiding surfaces 15 on the brake carrier member 1, and rattling noises are thereby avoided to a large extent. The reference numeral 25 identifies a plane which includes the axes 21 of the bolts 11, the position of the axes 21 and their common plane 25 being indicated in FIG. 3.

Figure 4:
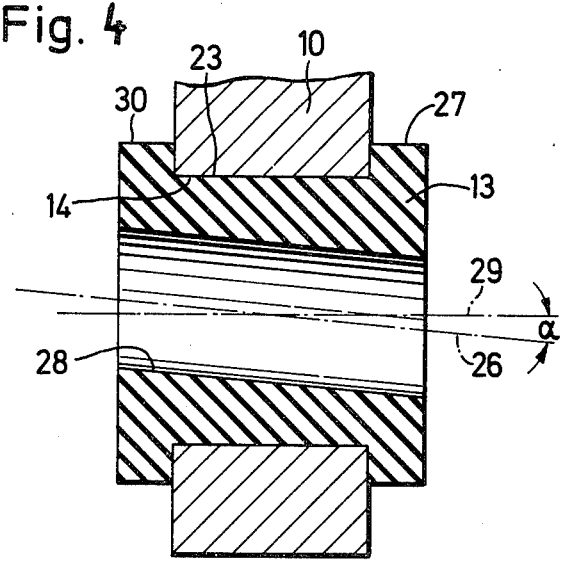
FIG. 4 is a sectioned fragmented view of a detail of the guide unit of FIG. 1.

An elastic intermediate element 13 is shown in FIGS. 2 and 4, which is accommodated in the cylindrical bore 14 of the brake caliper 10 and held therein in a rotation-preventing engagement, for example by gluing, and in which an axis 26 of an inner enclosing surface 28 is inclined by an angle α relative to an axis 29 of an outer peripheral surface 23.

An annular collar 27 which is provided at each end of the elastic intermediate element 13 serves to axially secure the elastic intermediate element 13 to the brake caliper member 10. After the brake caliper member 10 has been mounted onto the brake carrier member 1, the brake caliper member 10 is held and guided in parallelism with the planes formed by the axes 21 of the two bolts 11, due to the location of the bolts 11 and the location of the guiding surfaces 15. The axis 26 of the enclosing surface 28 is now made to approximately coincide with the axis 29 of the outer peripheral surface 23 of the elastic element 13, resulting in a deformation of the elastic element 13.

Figure 5:
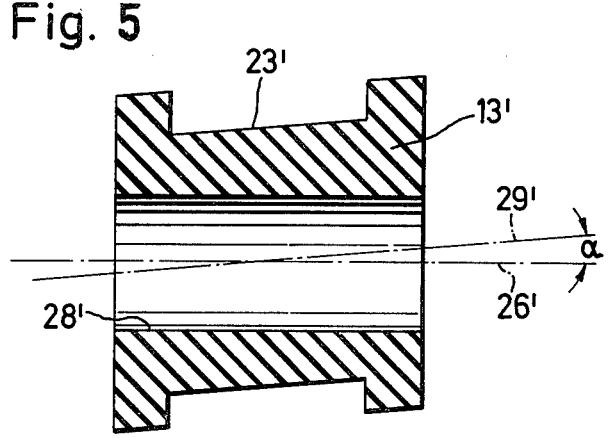
FIG. 5 is a sectional view of an intermediate element which may be used in the guide unit of FIG. 1 instead of that of FIG. 4.

In FIG. 5, an elastic intermediate element 13' is shown in which the axis 29' of the outer peripheral surface 23' is inclined at an angle α relative to the axis 26' of the inner enclosing surface 28'. After the elastic element 13' has been mounted in the cylindrical bore 14 of the brake caliper member 10, there results the same mounting position as has been described in connection with FIG. 4. During the assembly of the brake caliper member 10 with the brake carrier member 1, the same deformation of the elastic intermediate elements 13' takes place as has been described already with respect to FIGS. 2 and 4.

Deformation of the elastic intermediate element 13 or 13' will generate in the respective elastic intermediate element 13 or 13' a moment M acting on the brake caliper member 10 in a counterclockwise direction. As a result, the brake caliper member 10 is indirectly urged with the force F against the guiding surfaces 15 on the brake carrier member 1, thus preventing the brake caliper member 10 from lifting off from the guiding surfaces 15 as a result of vibrations to which the steering knuckle or the wheel carrier of an automotive vehicle is subjected when the vehicle travels on an uneven road surface. Thereby, rattling noises at the floating-caliper spot-type disc brake are avoided to a large extent.

Coming back to FIGS. 1 and 2, it may be seen that a brake actuator piston 17 serves to press the brake shoes 8, 9 against the disc 2. The actuator piston 17 is detachably connected in a snap-in manner to the brake shoe 9 via a ball clip 18 affixed to the backside of the carrier plate 7. The carrier plate 6 of the brake shoe 8 is in direct abutment with a leg 19 of the brake caliper member 10. When the brake is applied, the piston 17 causes displacement of the brake shoe 9 to the left as illustrated in FIGS. 1 and 2, until the brake shoe 9 engages the friction surface of the brake disc 2 after having overcome the brake clearance. Then the reaction force acting on the brake cylinder 12 shifts the brake caliper member 10 to the right, as a result of which the brake shoe 8 moves into contact with the brake disc 2 as well. As the degree of pad wear at the brake shoes 8,9 increases, the extent of displacement of the brake caliper 10 to the right gradually increases, while the brake piston 17 travels more out of the bore of the brake cylinder 12. The maximum amount of displacement of the brake caliper member 10 which the illustrated brake allows is shown by dot-dash line 20.

While we have described above the principles of our invention in connection with specific apparatus, it is to be clearly understood that this description is made only by way of example and not as a limitation to the scope of our invention as set forth in the accompanying claims.

We claim:

1. In a floating caliper spot-type disc brake, particularly for use in automotive vehicles, for applying braking forces to a disc rotatably mounted on a support, a combination comprising:
   a carrier member stationarily mounted on the support;
   a caliper member;
   means for guiding said caliper member on said carrier member for translatory movement in opposite directions along a predetermined axis at least through a plurality of assembled positions, including at least
   means for defining at least one opening in one of said members,
   at least one annular intermediate element accommodated in said opening and bounding a passage, and
   at least one elongated guide element secured to the other of said members and received in said passage in said assembled positions such that said passage and said elongated guide element are centered on a common axis parallel to said predetermined axis; and
   means for urging said members toward said assembled positions, including at least one elastically yieldable region of said intermediate element extending in its relaxed position assumed after the accommodation of said intermediate element in said opening and prior to the assembly of said members, asymmetrically with respect to said common axis into the space occupied by said elongated element in said assembled positions for said region to be elastically deformed and to apply its restoring forces asymmetrically to said elongated guide element in said assembled positions.

2. The combination as defined in claim 1, wherein said elastically yieldable region of said intermediate element is delimited by an internal surface which bounds said passage and is centered on an inclined axis spatially inclined relative to said common axis in said relaxed position.

3. The combination as defined in claim 2, wherein said defining means includes a confining surface in said one member which is centered on said inclined axis; and wherein said intermediate element has an external surface parallel to said internal surface and conforming to said confining surface at least after the accommodation of said intermediate element in said opening.

4. The combination as defined in claim 2, wherein said defining means includes a confining surface in said one member which is centered on an axis coinciding with said common axis; and wherein said intermediate element has an external surface centered on an axis inclined with respect to that of said internal surface to the extent of inclination of said inclined axis relative to said common axis after the accommodation of said intermediate element in said opening.

5. The combination as defined in claim 2, wherein said guide means guides said caliper member for said translatory movement through said assembled positions along a predetermined plane extending along said predetermined axis; and wherein said inclined axis is situated in a plane normal to said predetermined plane and intersecting said common same at the axis.

6. The combination as defined in claim 5, wherein said inclined axis encloses an angle of between 3° and 8° with that of said space and with said predetermined plane.

7. The combination as defined in claim 5, wherein said defining means, said guide and intermediate elements and said urging means together constitute a guiding unit; and wherein said guiding means further includes an additional guiding unit similar to said guiding unit and spaced therefrom transversely to said predetermined axis in said predetermined plane.

* * * * *